United States Patent
Chen

(10) Patent No.: US 11,804,800 B2
(45) Date of Patent: Oct. 31, 2023

(54) MOTOR CURRENT PROTECTING CIRCUIT

(71) Applicant: ANPEC ELECTRONICS CORPORATION, Hsinchu (TW)

(72) Inventor: Kun-Min Chen, Hsinchu (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 120 days.

(21) Appl. No.: 17/691,063

(22) Filed: Mar. 9, 2022

(65) Prior Publication Data
US 2023/0223887 A1 Jul. 13, 2023

(30) Foreign Application Priority Data
Jan. 10, 2022 (TW) ................................. 111100867

(51) Int. Cl.
*H02P 6/18* (2016.01)
*H02P 29/024* (2016.01)
*H02P 6/28* (2016.01)
*H02P 6/182* (2016.01)

(52) U.S. Cl.
CPC ............ *H02P 29/027* (2013.01); *H02P 6/182* (2013.01); *H02P 6/28* (2016.02)

(58) Field of Classification Search
CPC .......... H02P 29/027; H02P 6/28; H02P 6/182
USPC ..................................................... 318/400.34
See application file for complete search history.

(56) References Cited

U.S. PATENT DOCUMENTS

| | | | |
|---|---|---|---|
| 10,996,701 B1 * | 5/2021 | Wu ........................ | G05F 1/575 |
| 2016/0315539 A1 * | 10/2016 | Lee ........................ | H02M 1/088 |
| 2017/0318595 A1 * | 11/2017 | Dinan ................... | H04L 5/0053 |

* cited by examiner

*Primary Examiner* — Erick D Glass
(74) *Attorney, Agent, or Firm* — Li & Cai Intellectual Property Office

(57) ABSTRACT

A motor current protecting circuit is provided. A voltage calculating circuit determines whether or not each of low-side switches is fully turned on and then determines whether or not a voltage difference between a first terminal and a second terminal of each of the low-side switches being fully turned on is larger than or equal to a zero value. The voltage calculating circuit adds up the voltage differences each of which is larger than or equal to the zero value to output a voltage signal. A control circuit controls a driver circuit to switch the low-side switches and high-side switches according to the voltage signal.

20 Claims, 6 Drawing Sheets

MOTOR CURRENT PROTECTING CIRCUIT

CROSS-REFERENCE TO RELATED PATENT APPLICATION

This application claims the benefit of priority to Taiwan Patent Application No. 111100867, filed on Jan. 10, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor current protecting circuit.

BACKGROUND OF THE DISCLOSURE

In electronic devices, fans are used to cool heat generating components such as processors. When the heat generating components are cooled down by the fan, data of circuits of a motor of the fan needs to be instantly detected, and a rotational speed of the motor of the fan is precisely controlled according to the detected data such that the heat generating components are properly cooled down by the fan. A conventional detector circuit of the motor includes a resistor connected to a bridge circuit of the motor. A conventional control circuit switches the bridge circuit according to a current value or a voltage value of the resistor. However, additional power consumption is generated by the resistor.

SUMMARY OF THE DISCLOSURE

In response to the above-referenced technical inadequacies, the present disclosure provides a motor current protecting circuit. The motor current protecting circuit includes an output stage circuit, a voltage calculating circuit, a control circuit and a driver circuit. The output stage circuit includes a plurality of switch components. The plurality of switch components includes a plurality of high-side switches and a plurality of low-side switches. A first terminal of each of the plurality of high-side switches is coupled to an input voltage. First terminals of the plurality of low-side switches are respectively connected to second terminals of the plurality of high-side switches. A second terminal of each of the plurality of low-side switches is grounded. A node between the second terminal of each of the plurality of high-side switches and the first terminal of each of the plurality of low-side switches is connected to a motor. The voltage calculating circuit is connected to a first terminal and a second terminal of each of the plurality of low-side switches. The voltage calculating circuit is configured to determine whether or not each of the plurality of low-side switches is fully turned on. The voltage calculating circuit is configured to determine whether or not a voltage difference between the first terminal and the second terminal of each of the plurality of low-side switches is larger than or equal to a zero value. The voltage calculating circuit is configured to output a voltage signal according to all of the voltage differences each of which is larger than or equal to the zero value. The control circuit is connected to an output terminal of the voltage calculating circuit. The control circuit is configured to output a plurality of control signals according to the voltage signal. The driver circuit is connected to the control circuit and a control terminal of each of the plurality of switch components. The driver circuit is configured to drive the plurality of switch components respectively according to the plurality of control signals.

In certain embodiments, the voltage calculating circuit includes an adder configured to add up all of the voltage differences each of which is larger than or equal to the zero value to output the voltage signal.

In certain embodiments, the motor current protecting circuit further includes a comparator circuit. The comparator circuit is connected to the output terminal of the voltage calculating circuit and an input terminal of the control circuit. The comparator circuit is configured to compare a voltage of the voltage signal with a reference voltage to output a comparing signal to the control circuit. The control circuit outputs the plurality of control signals according to the comparing signal.

In certain embodiments, when the control circuit receives the comparing signal at a first level and a current of the motor is larger than a current limit threshold, the control circuit controls the driver circuit to turn off all of the plurality of high-side switches, and to fully turn on all of the plurality of low-side switches or to turn on one or more of the plurality of low-side switches according to a back electromotive force of each of phases of the motor. Alternatively, when the control circuit receives the comparing signal at the first level and the current of the motor is larger than the current limit threshold, the control circuit controls the driver circuit to turn off all of the plurality of low-side switches, and to fully turn on all of the plurality of high-side switches or to turn on one or more of the plurality of high-side switches according to the back electromotive force of each of the phases of the motor.

In certain embodiments, when the current of the motor is larger than an overcurrent threshold being larger than the current limit threshold, the control circuit controls the driver circuit to turn off all of the plurality of switch components.

In certain embodiments, the motor current protecting circuit further includes a position detector circuit connected to the control circuit. The position detector circuit is configured to detect a back electromotive force of each of the phases of the motor to output a back electromotive force signal to the control circuit. When the control circuit receives the comparing signal at the first level and the current of the motor is larger than the current limit threshold, the control circuit controls the driver circuit to turn on one or more of the plurality of low-side switches according to the back electromotive force signal.

In certain embodiments, the voltage calculating circuit includes a first operational amplifier, a second operational amplifier, and a third operational amplifier. A first input terminal of the first operational amplifier is connected to a first terminal of the motor. A second input terminal of the first operational amplifier is connected to a first terminal of a first transistor. An output terminal of the first operational amplifier is connected to a control terminal of the first transistor. A second terminal of the first transistor is connected to the output terminal of the voltage calculating circuit. A first input terminal of the second operational amplifier is connected to a second terminal of the motor. A second input terminal of the second operational amplifier is connected to a first terminal of a second transistor. An output terminal of the second operational amplifier is connected to a control terminal of the second transistor. A second terminal of the second transistor is connected to the output terminal of the voltage calculating circuit. A first input terminal of the third operational amplifier is connected to a third terminal of the motor. A second input terminal of the third operational amplifier is connected to a first terminal of a third transistor. An output terminal of the third operational amplifier is connected to a control terminal of the third transistor. A second terminal of the third transistor is connected to the output terminal of the voltage calculating circuit.

In certain embodiments, the voltage calculating circuit further includes a first switch component, a second switch component and a third switch component. A first terminal of the first switch component is connected to the first terminal of the motor. A second terminal of the first switch component is connected to the first input terminal of the first operational amplifier. A first terminal of the second switch component is connected to the second terminal of the motor. A second terminal of the second switch component is connected to the first input terminal of the second operational amplifier. A third switch component, wherein a first terminal of the third switch component is connected to the third terminal of the motor. A second terminal of the third switch component is connected to the first input terminal of the third operational amplifier.

In certain embodiments, the voltage calculating circuit further includes a first input resistor, a second input resistor and a third input resistor. A first terminal of the first input resistor is connected to the first input terminal of the first operational amplifier. A second terminal of the first input resistor is grounded. A first terminal of the second input resistor is connected to the first input terminal of the second operational amplifier. A second terminal of the second input resistor is grounded. A first terminal of the third input resistor is connected to the first input terminal of the third operational amplifier. A second terminal of the third input resistor is grounded.

In certain embodiments, the voltage calculating circuit further includes a first resistor, a second resistor and a third resistor. A first terminal of the first resistor is connected to the first terminal of the first transistor. A second terminal of the first resistor is grounded. A first terminal of the second resistor is connected to the first terminal of the second transistor. A second terminal of the second resistor is grounded. A first terminal of the third resistor is connected to the first terminal of the third transistor. A second terminal of the third resistor is grounded.

In certain embodiments, the voltage calculating circuit further includes a first current mirror circuit, a second current mirror circuit and a third current mirror circuit. The first current mirror circuit includes a fourth transistor and a fifth transistor. A first terminal of the fourth transistor and a first terminal of the fifth transistor are coupled to a common voltage. A second terminal of the fourth transistor is connected to a control terminal of the fourth transistor. A second terminal of the first transistor and a control terminal of the fifth transistor. A second terminal of the fifth transistor is connected to the output terminal of the voltage calculating circuit. The second current mirror circuit includes a sixth transistor and a seventh transistor. A first terminal of the sixth transistor and a first terminal of the seventh transistor are coupled to the common voltage. A second terminal of the sixth transistor is connected to a control terminal of the sixth transistor. A second terminal of the second transistor and a control terminal of the seventh transistor. A second terminal of the seventh transistor is connected to the output terminal of the voltage calculating circuit. A third current mirror circuit includes an eighth transistor and a ninth transistor. A first terminal of the eighth transistor and a first terminal of the ninth transistor are coupled to the common voltage. A second terminal of the eighth transistor is connected to a control terminal of the eighth transistor. A second terminal of the third transistor and a control terminal of the ninth transistor. A second terminal of the ninth transistor is connected to the output terminal of the voltage calculating circuit.

In certain embodiments, the voltage calculating circuit further includes an output resistor. A first terminal of the output resistor is connected to an output terminal of the first current mirror circuit. An output terminal of the second current mirror circuit. An output terminal of the third current mirror circuit and the output terminal of the voltage calculating circuit. A second terminal of the output resistor is grounded.

In certain embodiments, the motor current protecting circuit further includes a plurality of voltage regulator circuits. Output terminals of the plurality of voltage regulator circuits are respectively connected to the control terminals of the plurality of low-side switches. The plurality of voltage regulator circuits are configured to respectively regulate the plurality of low-side switches.

In certain embodiments, each of the plurality of voltage regulator circuits includes an operational amplifier. A first input terminal of the operational amplifier is connected to the node between the second terminal of one of the plurality of high-side switches and the first terminal of one of the plurality of low-side switches. A second input terminal of the operational amplifier is coupled to the input voltage. An output terminal of the operational amplifier is connected to the control terminal of the one of the plurality of low-side switches. When the current of the motor is larger than the overcurrent threshold, the plurality of voltage regulator circuits respectively regulate the plurality of low-side switches to turn off the plurality of low-side switches.

In certain embodiments, each of the plurality of voltage regulator circuits further includes a first voltage divider resistor and a second voltage divider resistor. A first terminal of the first voltage divider resistor is coupled to the input voltage. A second terminal of the first voltage divider resistor is connected to a first terminal of the second voltage divider resistor. A second terminal of the second voltage divider resistor is grounded. A node between the second terminal of the first voltage divider resistor and the first terminal of the second voltage divider resistor is connected to the second input terminal of the operational amplifier.

In certain embodiments, each of the plurality of voltage regulator circuits further includes a third voltage divider resistor and a fourth voltage divider resistor. A first terminal of the third voltage divider resistor is connected to the node between the second terminal of one of the plurality of high-side switches and the first terminal of one of the plurality of low-side switches. A second terminal of the third voltage divider resistor is connected to a first terminal of the fourth voltage divider resistor. A second terminal of the fourth voltage divider resistor is grounded. A node between the second terminal of the third voltage divider resistor and the first terminal of the fourth voltage divider resistor is connected to the first input terminal of the operational amplifier.

In certain embodiments, the plurality of high-side switches include a first high-side switch, a second high-side switch and a third high-side switch. The plurality of low-side switches include a first low-side switch, a second low-side switch and a third low-side switch. A first terminal of the first high-side switch is coupled to the input voltage. A first terminal of the first low-side switch is connected to a second terminal of the first high-side switch. A node between the first terminal of the first low-side switch and the second terminal of the first high-side switch is connected to a first terminal of the motor. A second terminal of the first low-side switch is grounded. A first terminal of the second high-side switch is coupled to the input voltage. A first terminal of the second low-side switch is connected to a second terminal of the second high-side switch. A node between the first terminal of the second low-side switch and the second terminal of the second high-side switch is connected to a second terminal of the motor. A second terminal of the second low-side switch is grounded. A first terminal of the third high-side switch is coupled to the input voltage. A first terminal of the third low-side switch is connected to a second terminal of the third high-side switch. A node between the first terminal of the third low-side switch and the second terminal of the third high-side switch is connected to a third terminal of the motor. A second terminal of the third low-side switch is grounded.

In another aspect, the present disclosure provides a motor current protecting circuit. The motor current protecting circuit includes an output stage circuit, a voltage calculating circuit, a control circuit and a driver circuit. The output stage circuit includes a plurality of switch components. The plurality of switch components includes a plurality of high-side switches and a plurality of low-side switches. The output stage circuit includes a plurality of switch components. The plurality of switch components include a plurality of high-side switches and a plurality of low-side switches. A first terminal of each of the plurality of high-side switches is coupled to an input voltage. First terminals of the plurality of low-side switches are respectively connected to second terminals of the plurality of high-side switches. A second terminal of each of the plurality of low-side switches is grounded. A node between the second terminal of each of the plurality of high-side switches and the first terminal of each of the plurality of the low-side switches is connected to a motor. The voltage calculating circuit is connected to a first terminal and a second terminal of each of the plurality of high-side switches. The voltage calculating circuit is configured to determine whether or not each of the plurality of high-side switches is fully turned on. The voltage calculating circuit is configured to determine whether or not a voltage difference between the first terminal and the second terminal of each of the plurality of high-side switches is larger than or equal to a zero value. The voltage calculating circuit is configured to output a voltage signal according to the voltage difference according to all of the voltage differences each of which is larger than or equal to the zero value. The control circuit is connected to an output terminal of the voltage calculating circuit and configured to output a plurality of control signals according to the voltage signal. The driver circuit is connected to the control circuit and a control terminal of each of the plurality of switch components. The driver circuit is configured to drive the plurality of switch components respectively according to the plurality of control signals.

In certain embodiments, the motor current protecting circuit further includes a comparator circuit. The comparator circuit is connected to the output terminal of the voltage calculating circuit and an input terminal of the control circuit. The comparator circuit is configured to compare a voltage of the voltage signal with a reference voltage to output a comparing signal to the control circuit. The control circuit outputs the plurality of control signals according to the comparing signal.

In certain embodiments, when the control circuit receives the comparing signal at a first level and a current of the motor is larger than a current limit threshold, the control circuit controls the driver circuit to turn off all of the plurality of high-side switches, and to fully turn on all of the plurality of low-side switches or to turn on one or more of the plurality of low-side switches according to a back electromotive force of each of phases of the motor. Alternatively, when the control circuit receives the comparing signal at the first level and the current of the motor is larger than the current limit threshold, the control circuit controls the driver circuit to turn off all of the plurality of low-side switches, and to fully turn on all of the plurality of high-side switches or to turn on one or more of the plurality of high-side switches according to the back electromotive force of each of the phases of the motor.

As described above, the present disclosure provides the motor current protecting circuit. The motor current protecting circuit of the present disclosure determines whether or not each of the plurality of high-side switches or each of the plurality of low-side switches is fully turned on, and calculates the voltage difference between the first terminal and the second terminal of each of the high-side switches being fully turned on or each of the low-side switches being fully turned on. Then, the motor current protecting circuit of the present disclosure performs the calculation on all of the voltage differences each of which is larger than or equal to the zero value to output the voltage signal. Finally, the motor current protecting circuit switches the high-side switches and the low-side switches according to the voltage signal.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
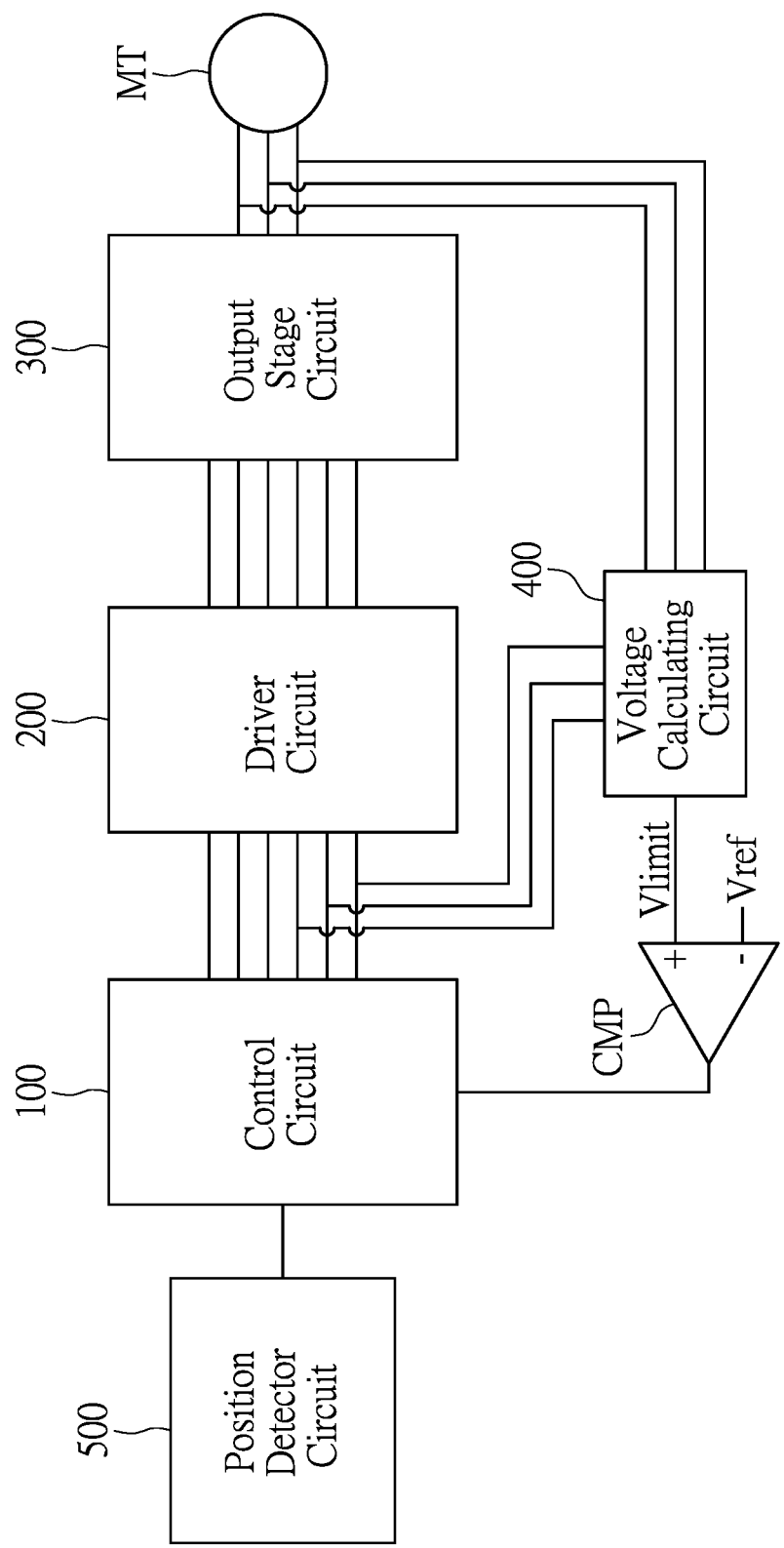
FIG. 1 is a circuit diagram of a motor current protecting circuit and a motor according to an embodiment.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
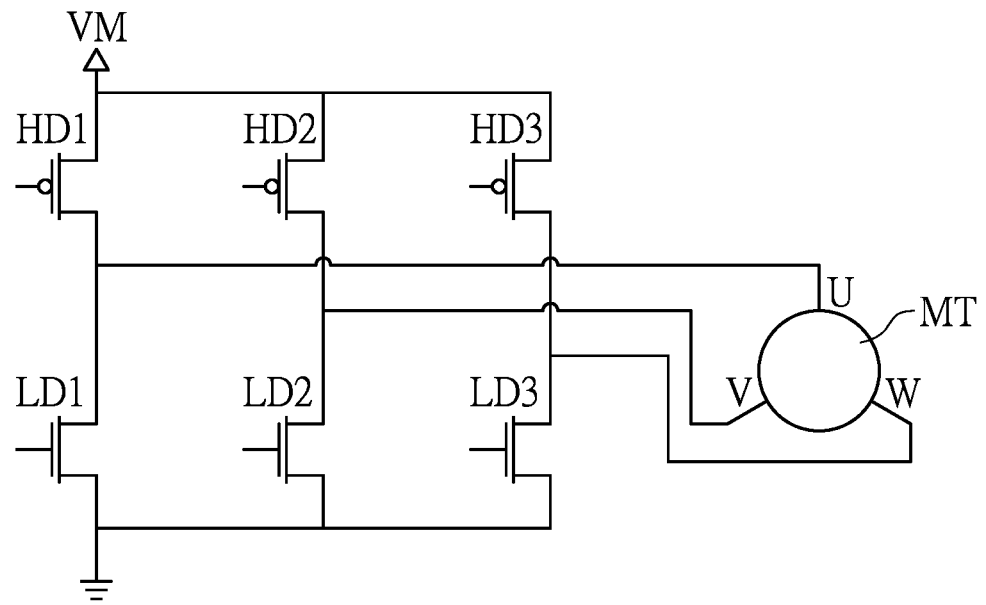
FIG. 2 is a circuit diagram of an output stage circuit of the motor current protecting circuit and the motor according to the embodiment.
Figure 3:
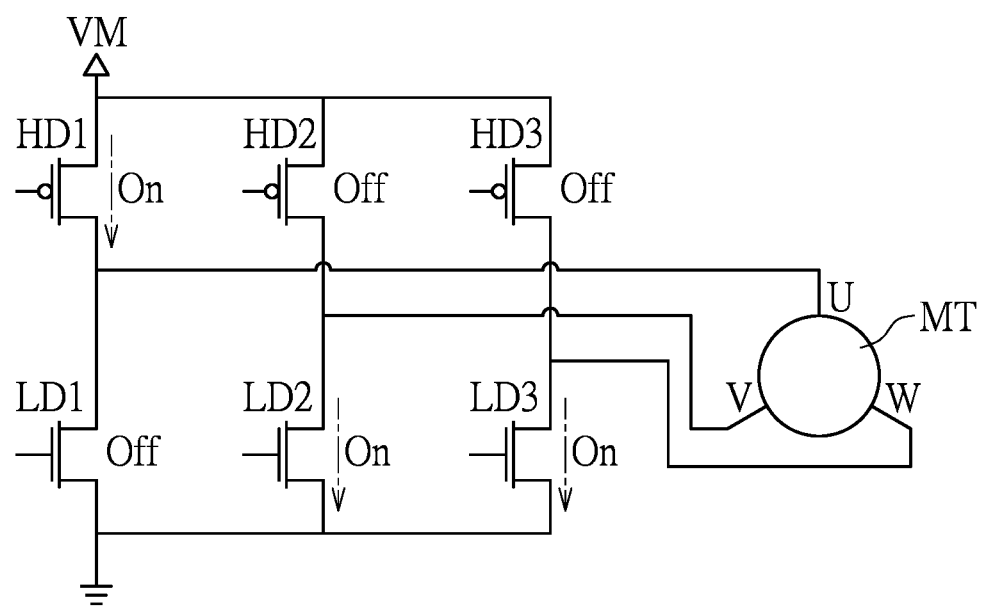
FIG. 3 is a schematic diagram of on states and off states of high-side switches and low-side switches of the output stage circuit of the motor current protecting circuit according to the embodiment of the present disclosure.
Figure 4:
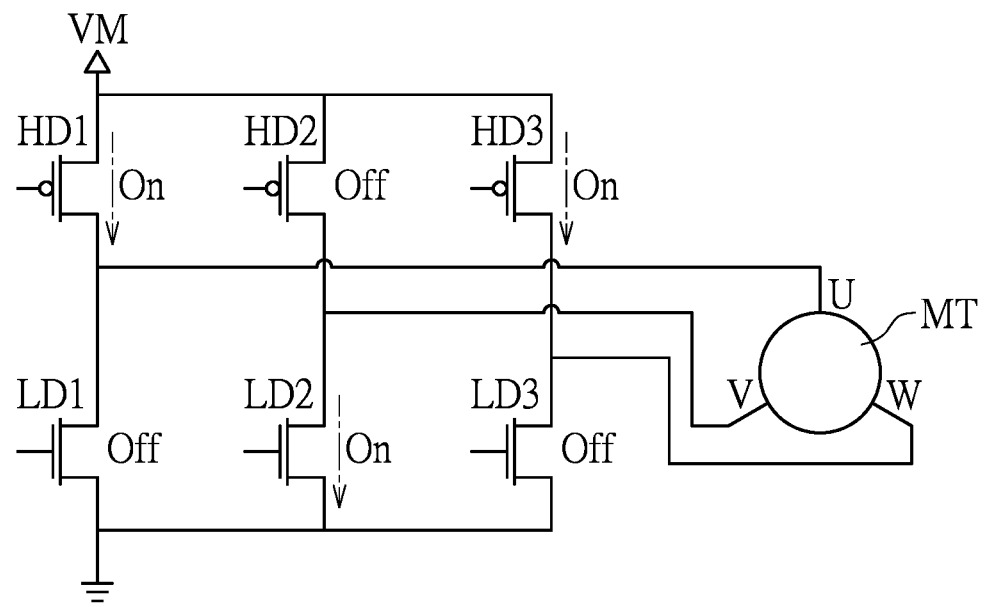
FIG. 4 is a schematic diagram of the on states and the off states of the high-side switches and the low-side switches of the output stage circuit of the motor current protecting circuit according to the embodiment of the present disclosure.
Figure 5:
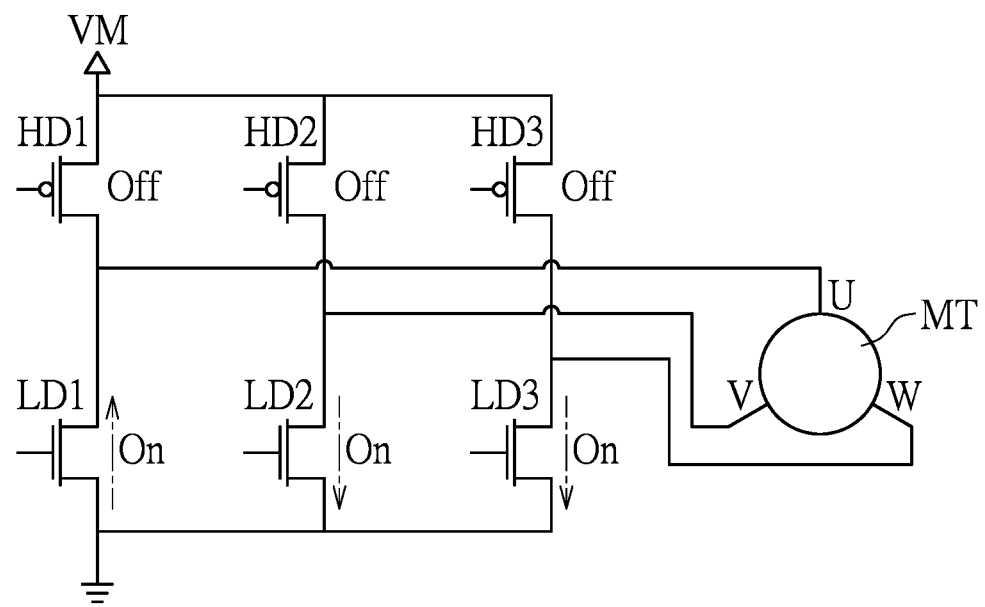
FIG. 5 is a schematic diagram of the on states and the off states of the high-side switches and the low-side switches of the output stage circuit of the motor current protecting circuit according to the embodiment of the present disclosure.

Reference is made to FIGS. 1 to 5, in which FIG. 1 is a circuit diagram of a motor current protecting circuit and a motor according to an embodiment, FIG. 2 is a circuit diagram of an output stage circuit of the motor current protecting circuit and the motor according to the embodiment, and FIGS. 3 to 5 are schematic diagrams of on states and off states of high-side switches and low-side switches of the output stage circuit of the motor current protecting circuit according to the embodiment of the present disclosure.

The motor current protecting circuit of the embodiment of the present disclosure may be applied to control a motor MT to rotate as shown in FIG. 1. The motor current protecting circuit may include a control circuit 100, a driver circuit 200, an output stage circuit 300, a voltage calculating circuit 400, a comparator circuit (including a comparator CMP), and a position detector circuit 500 as shown in FIG. 1, some of which may be omitted in practice.

As shown in FIG. 1, the control circuit 100 may be connected to an input terminal of the driver circuit 200, an output terminal of the position detector circuit 500 and an output terminal (of the comparator CMP) of the comparator circuit. The output stage circuit 30 may be connected to an output terminal of the driver circuit 200 and the motor MT. The voltage calculating circuit 400 may be connected to the output stage circuit 300 and an input terminal (of the comparator CMP) of the comparator circuit.

The output stage circuit 300 shown in FIG. 1 may include a plurality of switch components. The plurality of switch components may include a plurality of high-side switches (such as a first high-side switch HD1, a second high-side switch HD2 and a third high-side switch HD3 as shown in FIG. 2), and a plurality of low-side switches (such as a first low-side switch LD1, a second low-side switch LD2 and a third low-side switch LD3 as shown in FIG. 2).

As shown in FIG. 2, a first terminal of the first high-side switch HD1 may be coupled to the input voltage VM. A first terminal of the first low-side switch LD1 is connected to a second terminal of the first high-side switch HD1. A node between the first terminal of the first low-side switch LD1 and the second terminal of the first high-side switch HD1 is connected to a first terminal U of the motor MT. A second terminal of the first low-side switch LD1 is grounded.

A first terminal of the second high-side switch HD2 may be coupled to the input voltage VM. A first terminal of the second low-side switch LD2 is connected to a second terminal of the second high-side switch HD2. A node between the first terminal of the second low-side switch LD2 and the second terminal of the second high-side switch HD2 is connected to a second terminal V of the motor MT. A second terminal of the second low-side switch LD2 is grounded.

A first terminal of the third high-side switch HD3 may be coupled to the input voltage VM. A first terminal of the third low-side switch LD3 is connected to a second terminal of the third high-side switch HD3. A node between the first terminal of the third low-side switch LD3 and the second terminal of the third high-side switch HD3 is connected to a third terminal W of the motor MT. A second terminal of the third low-side switch LD3 is grounded.

The voltage calculating circuit 400 may be connected to a first terminal and a second terminal of each of the low-side switches (such as the first low-side switch LD1, the second low-side switch LD2 and the third low-side switch LD3 as shown in FIG. 2). The voltage calculating circuit 400 may determine whether or not each of the plurality of low-side switches is fully turned on. Then, the voltage calculating circuit 400 may determine whether or not a voltage difference between the first terminal (such as a drain terminal) and the second terminal (such as a source terminal) of each of the plurality of low-side switches is larger than or equal to a zero value.

After the voltage calculating circuit 400 calculates the voltage differences between the first terminals and the second terminals of all of the plurality of low-side switches being fully turned on, the voltage calculating circuit 400 performs calculations on all of the voltage differences each of which is larger than or equal to the zero value to output a voltage signal Vlimit. For example, the voltage calculating circuit 400 may include an adder configured to add up all of the voltage differences each of which is larger than or equal to the zero value to output the voltage signal Vlimit.

For example, as shown in FIG. 3, the second low-side switch LD2 and the third low-side switch LD3 are fully turned on. Furthermore, the voltage difference between the first terminal of the second low-side switch LD2 and the second terminal of the second low-side switch LD2 is larger than the zero value. The voltage difference between the first terminal of the second low-side switch LD3 and the second terminal of the second low-side switch LD3 is larger than the zero value. Under this condition, the voltage calculating circuit 400 may calculate a sum of the voltage difference between the first terminal and the second terminal of the second low-side switch LD2 and the voltage difference between the first terminal and the second terminal of the second low-side switch LD3 to calculate a voltage value. Then, the voltage calculating circuit 400 outputs the voltage signal Vlimit according to the calculated voltage value.

As shown in FIG. 4, among the plurality of low-side switches, only the second low-side switch LD2 is turned on. Therefore, the voltage value of the voltage signal Vlimit outputted by the voltage calculating circuit 400 may be equal to the voltage difference between the first terminal and the second terminal of the second low-side switch LD2.

As shown in FIG. 5, the first low-side switch LD1, the second low-side switch LD2 and the third low-side switch LD3 are fully turned on. The voltage difference between the first terminal and the second terminal of the second low-side switch LD2 is larger than the zero value. The voltage difference between the first terminal and the second terminal of the second low-side switch LD3 is also larger than the zero value. However, a voltage difference between the first terminal and the second terminal of the first low-side switch LD1 is smaller than the zero value. Under this condition, the voltage calculating circuit 400 calculates the sum of the voltage difference between the first terminal and the second terminal of the second low-side switch LD2 and the voltage difference between the first terminal and the second terminal of the second low-side switch LD3 to calculate the voltage value. Then, the voltage calculating circuit 400 outputs the voltage signal Vlimit according to the calculated voltage value.

The control circuit 100 may receive the voltage signal Vlimit from the voltage calculating circuit 400 and then output a plurality of control signals according to the voltage signal Vlimit. The driver circuit 200 may, according to the plurality of control signals from the control circuit 100, output a plurality of driving signals respectively to the plurality of switch components to drive the plurality of switch components such as the first high-side switch HD1, the second high-side switch HD2, the third high-side switch HD3, the first low-side switch LD1, the second low-side switch LD2 and the third low-side switch LD3 as shown in FIG. 2.

Further, a first input terminal such as a non-inverting terminal of the comparator CMP may be connected to an output terminal of the voltage calculating circuit 400 and receive the voltage signal Vlimit from the voltage calculating circuit 400. A second input terminal such as an inverting terminal of the comparator CMP may be coupled to a reference voltage Vref. The comparator CMP may compare the voltage signal Vlimit from the voltage calculating circuit 400 with the reference voltage Vref to output a comprising signal. The control circuit 100 may output the plurality of control signals to the driver circuit 200 according to the comprising signal from the comparator CMP.

When the control circuit 100 receives the comparing signal at a first level such as a high level from the comparator CMP and a current of the motor MT is larger than a current limit threshold (such as, but not limited to, 1.2 A), the control circuit 100 may control the driver circuit 200 to turn off all of the plurality of high-side switches, and to fully turn on all of the plurality of low-side switches or to turn on one or more of the plurality of low-side switches based on a back electromotive force of each of phases of the motor MT, at the same time. As a result, a reverse current of the back electromotive force is not generated.

Alternatively, the voltage calculating circuit 400 may be connected to the first terminal and the second terminal of each of the plurality of high-side switches (such as the first high-side switch HD1, the second high-side switch HD2 and the third high-side switch HD3 as shown in FIG. 2). The voltage calculating circuit 400 may determine whether or not each of the plurality of high-side switches is fully turned on and the voltage difference between the first terminal (such as a drain terminal) and the second terminal (such as a source terminal) of each of the plurality of high-side switches being fully turned on is larger than or equal to the zero value. The voltage calculating circuit 400 may perform (addition) operations on all of the voltage differences each of which is larger than or equal to the zero value to output the voltage signal Vlimit.

When the control circuit 100 receives the comparing signal at the first level such as the high level from the comparator CMP and the current of the motor MT is larger than the current limit threshold, the control circuit 100 may control the driver circuit 200 to turn off all of the plurality of low-side switches, and to fully turn on all of the plurality of high-side switches or to turn on one or more of the plurality of high-side switches based on the back electromotive force of each of the phases of the motor MT.

Then, when the current of the motor MT is larger than an overcurrent threshold (such as, but not limited to, 1.8 A), the control circuit 100 may control the driver circuit 200 to turn off all of the plurality of high-side switches and the plurality of low-side switches.

Figure 6:
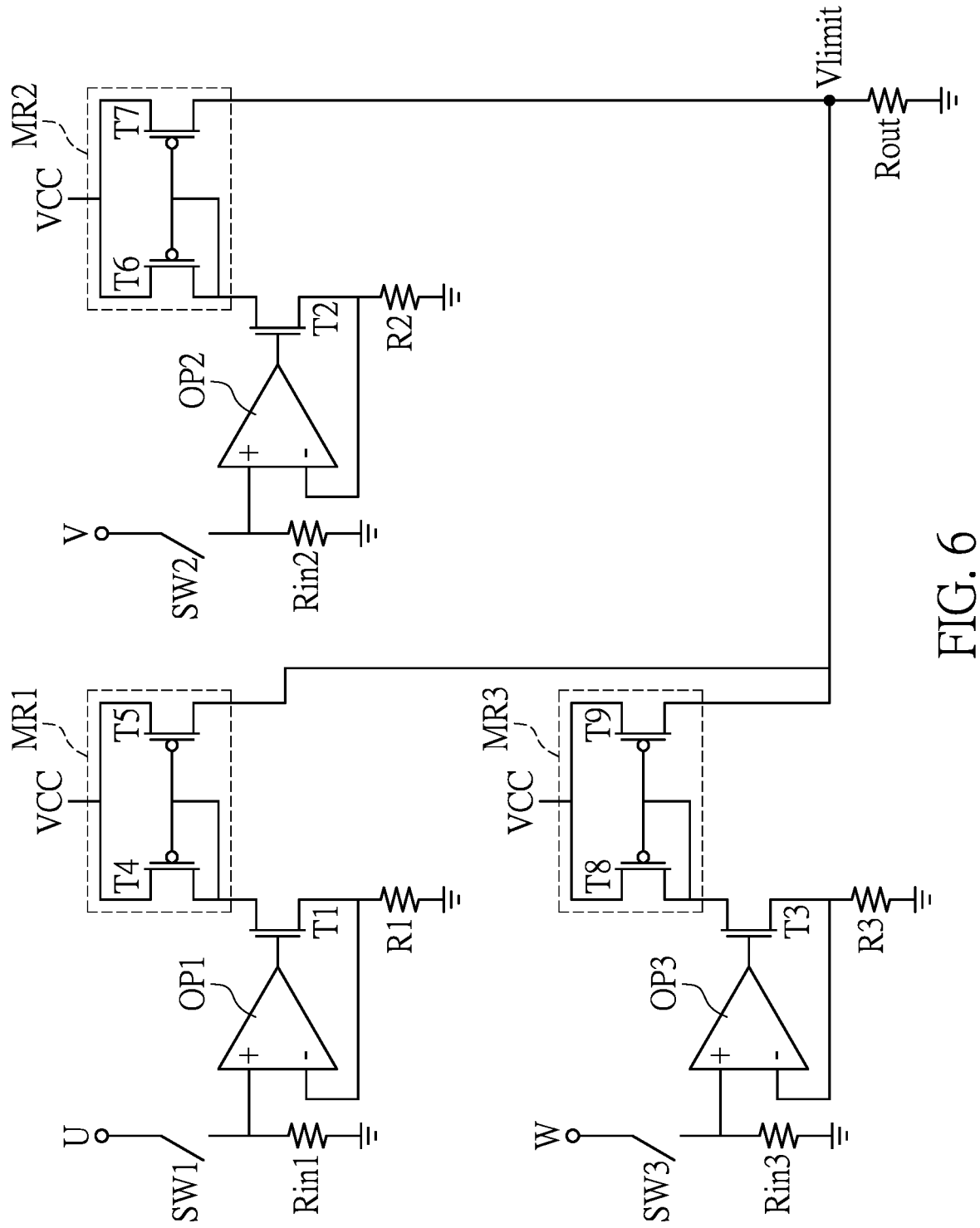
FIG. 6 is a circuit diagram of a voltage calculating circuit of the motor current protecting circuit according to the embodiment.

Reference is made to FIGS. 1 and 6, in which FIG. 6 is a circuit diagram of a voltage calculating circuit of the motor current protecting circuit according to the embodiment.

For example, the voltage calculating circuit 400 shown in FIG. 1 may include one or more of a first operational amplifier OP1, a second operational amplifier OP2, a third operational amplifier OP3, a first switch component SW1, a second switch component SW2, a third switch component SW3, a first input resistor Rin1, a second input resistor Rin2, a third input resistor Rin3, a first resistor R1, a second resistor R2, a third resistor R3, a first current mirror circuit MR1, a second current mirror circuit MR2, a third current mirror circuit MR3, a first transistor T1, a second transistor T2, a third transistor T3 and an output resistor Rout as shown in FIG. 6. The first resistor R1, the second resistor R2 and the third resistor R3 are resistors of metal oxide semiconductor field effect transistors, but the present disclosure is not limited thereto.

The first input resistor Rin1 may be replaced with a plurality of first resistors that are connected to each other. A sum of resistances of the plurality of first resistors may be equal to a resistance of the first input resistor Rin1. The first input resistor Rin1 may be a resistor of a transistor.

Similarly, the second input resistor Rin2 may be replaced with a plurality of second resistors that are connected to each other. A sum of resistances of the plurality of second resistors may be equal to a resistance of the second input resistor Rin2 The second input resistor Rin2 may be a resistor of a transistor.

Similarly, the third input resistor Rin3 may be replaced with a plurality of third resistors that are connected to each other. A sum of resistances of the plurality of third resistors may be equal to a resistance of the third input resistor Rin3. The third input resistor Rin3 may be a resistor of a transistor.

A first terminal of the first switch component SW1 as shown in FIG. 6 may be connected to the first terminal U of the motor MT as shown in FIG. 1. A second terminal of the first switch component SW1 may be connected to a first input terminal such as a non-inverting input terminal of the first operational amplifier OP1. A first terminal of the first input resistor Rin1 may be connected to the first input terminal such as the non-inverting input terminal of the first operational amplifier OP1. A second terminal of the first input resistor Rin1 may be grounded.

A second input terminal such as an inverting input terminal of the first operational amplifier OP1 may be connected to a first terminal of the first transistor T1. A first terminal of the first transistor T1 may be connected to a first terminal of the first resistor R1. A second terminal of the first resistor R1 may be grounded. An output terminal of the first operational amplifier OP1 may be connected to a control terminal of the first transistor T1. A second terminal of the first transistor T1 may be connected to an input terminal of the first current mirror circuit MR1.

The first current mirror circuit MR1 may include a fourth transistor T4 and a fifth transistor T5. A first terminal of the fourth transistor T4 and a first terminal of the fifth transistor T5 may be coupled to a common voltage VCC. A second terminal of the fourth transistor T4 (that is the input terminal of the first current mirror circuit MR1) may be connected to a control terminal of the fourth transistor T4, the second terminal of the first transistor T1 and a control terminal of the fifth transistor T5. A second terminal of the fifth transistor T5 (that is the output terminal of the first current mirror circuit MR1) may be connected to the output terminal of the voltage calculating circuit 400. The output terminal of the voltage calculating circuit 400 as shown in FIG. 6 may be connected to the first input terminal such as the non-inverting terminal of the comparator CMP as shown in FIG. 1. A first terminal of the output resistor Rout may be connected to the output terminal of the voltage calculating circuit 400. A second terminal of the output resistor Rout may be grounded.

A first terminal of the second switch component SW2 as shown in FIG. 6 may be connected to the second terminal V of the motor MT as shown in FIG. 1. A second terminal of the second switch component SW2 may be connected to a first input terminal such as a non-inverting input terminal of the second operational amplifier OP2. A first terminal of the second input resistor Rin2 may be connected to the first input terminal such as the non-inverting input terminal of the second operational amplifier OP2. A second terminal of the second input resistor Rin2 may be grounded.

A second input terminal such as an inverting input terminal of the second operational amplifier OP2 may be connected to a first terminal of the second transistor T2. A first terminal of the second transistor T2 may be connected to a first terminal of the second resistor R2. A second terminal of the second resistor R2 may be grounded. An output terminal of the second operational amplifier OP2 may be connected to a control terminal of the second transistor T2. A second terminal of the second transistor T2 may be connected to an input terminal of the second current mirror circuit MR2.

The second current mirror circuit MR2 may include a sixth transistor T6 and a seventh transistor T7. A first terminal of the sixth transistor T6 and a first terminal of the seventh transistor T7 may be coupled to the common voltage VCC. A second terminal of the sixth transistor T6 (that is the input terminal of the second current mirror circuit MR2) may be connected to a control terminal of the sixth transistor T6, the second terminal of the second transistor T2 and a control terminal of the seventh transistor T7. A second terminal of the seventh transistor T7 (that is the output terminal of the second current mirror circuit MR2) may be connected to the output terminal of the voltage calculating circuit 400.

A first terminal of the first switch component SW1 as shown in FIG. 6 may be connected to the second terminal W of the motor MT. A second terminal of the third switch component SW3 may be connected to a first input terminal such as a non-inverting input terminal of the third operational amplifier OP3. A first terminal of the third input resistor Rin3 may be connected to the first input terminal such as the non-inverting input terminal of the third operational amplifier OP3. A second terminal of the third input resistor Rin3 may be grounded.

A second input terminal such as an inverting input terminal of the third operational amplifier OP3 may be connected to a first terminal of the third transistor T3. A first terminal of the third transistor T3 may be connected to a first terminal of the third resistor R3. A second terminal of the third resistor R3 may be grounded. An output terminal of the third operational amplifier OP3 may be connected to a control terminal of the third transistor T3. A second terminal of the third transistor T3 may be connected to an input terminal of the third current mirror circuit MR3.

The third current mirror circuit MR3 may include an eighth transistor T8 and a ninth transistor T9. A first terminal of the eighth transistor T8 and a first terminal of the ninth transistor T9 are coupled to the common voltage VCC. A second terminal of the eighth transistor T8 (that is the input terminal of the third current mirror circuit MR3) may be connected to a control terminal of the eighth transistor T8, a second terminal of the third transistor T3 and a control terminal of the ninth transistor T9. A second terminal of the ninth transistor T9 (that is the output terminal of the third current mirror circuit MR3) may be connected to the output terminal of the voltage calculating circuit 400.

Figure 7:
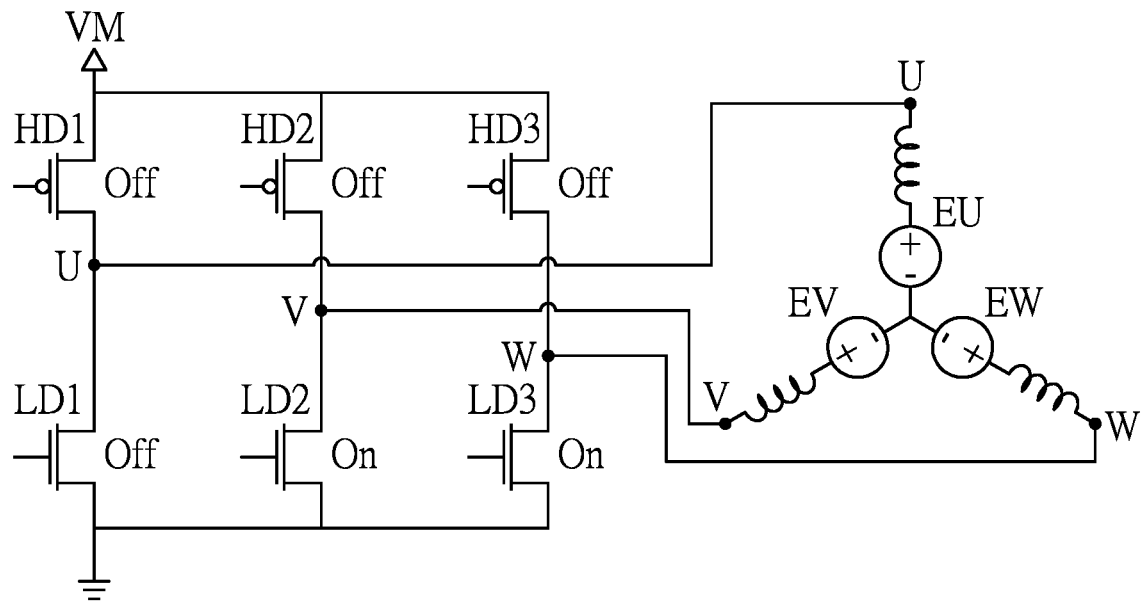
FIG. 7 is a schematic diagram of the low-side switches being switched based on back electromotive forces by the motor current protecting circuit according to the embodiment of the present disclosure.
Figure 8:
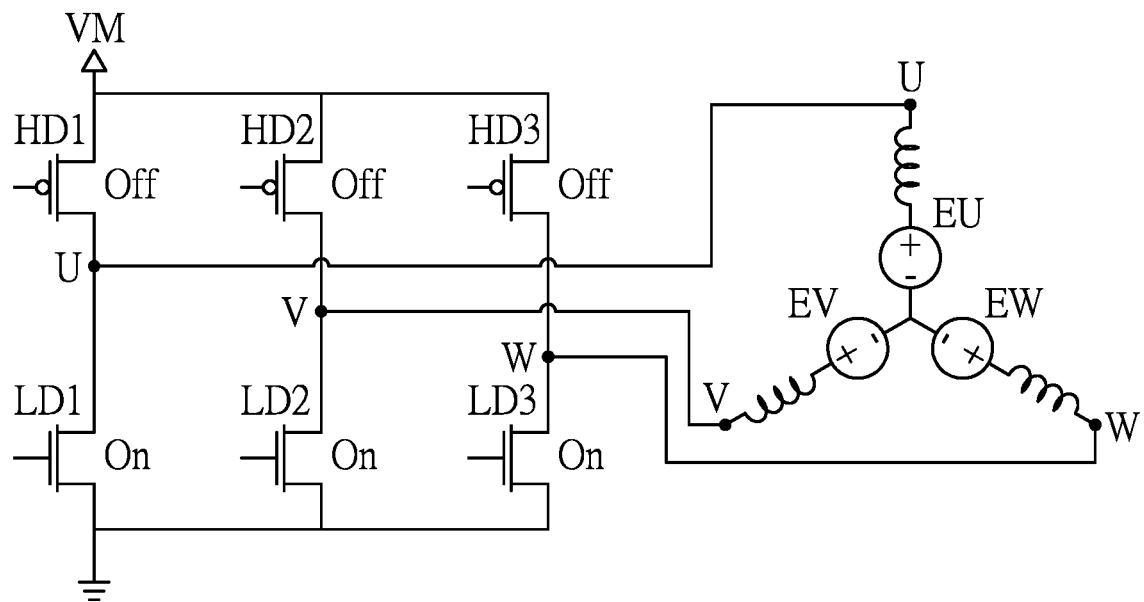
FIG. 8 is a schematic diagram of the low-side switches being fully turned on by a conventional driver circuit.

Reference is made to FIGS. 1, 7 and 8, in which FIG. 7 is a schematic diagram of the low-side switches being switched based on back electromotive forces by the motor current protecting circuit according to the embodiment of the present disclosure, and FIG. 8 is a schematic diagram of the low-side switches being fully turned on by a conventional driver circuit.

As shown in FIG. 1, the motor current protecting circuit of the embodiment of the present disclosure may include a position detector circuit 500. The position detector circuit 500 may be connected to the control circuit 100. The position detector circuit 500 may detect the back electromotive forces of each of the phases of the motor MT (such as back electromotive forces EU, EV, EW respectively of a U phase, a V phase and a W phase of the motor MT) to output a back electromotive force signal to the control circuit 100.

When the control circuit 100 receives the comparing signal at the first level such as the high level from the comparator CMP and the current of the motor MT is larger than the current limit threshold, the control circuit 100 may control the driver circuit 200 to turn off all of the plurality of high-side switches, and to turn on one or more of the plurality of low-side switches based on the back electromotive forces of the back electromotive force signal. As a result, the reverse current of the back electromotive force is not generated. As shown in FIG. 7, the control circuit 100 controls the driver circuit 200 to turn off the first high-side switch HD1, the second high-side switch HD2 and the third high-side switch HD3, and to turn on the second low-side switch LD2 and the third low-side switch LD3 based on the back electromotive forces EU, EV, EW of the motor MT, at the same time.

In contrast, when a conventional driver circuit determines that the current of the motor MT is larger than the current limit threshold, the conventional driver circuit turns on all of the plurality of low-side switches such as the first low-side switch LD1, the second low-side switch LD2 and the third low-side switch LD3 as shown in FIG. 8. As a result, reverse currents of the back electromotive forces EU, EV, EW of the motor MT are generated.

Figure 9:
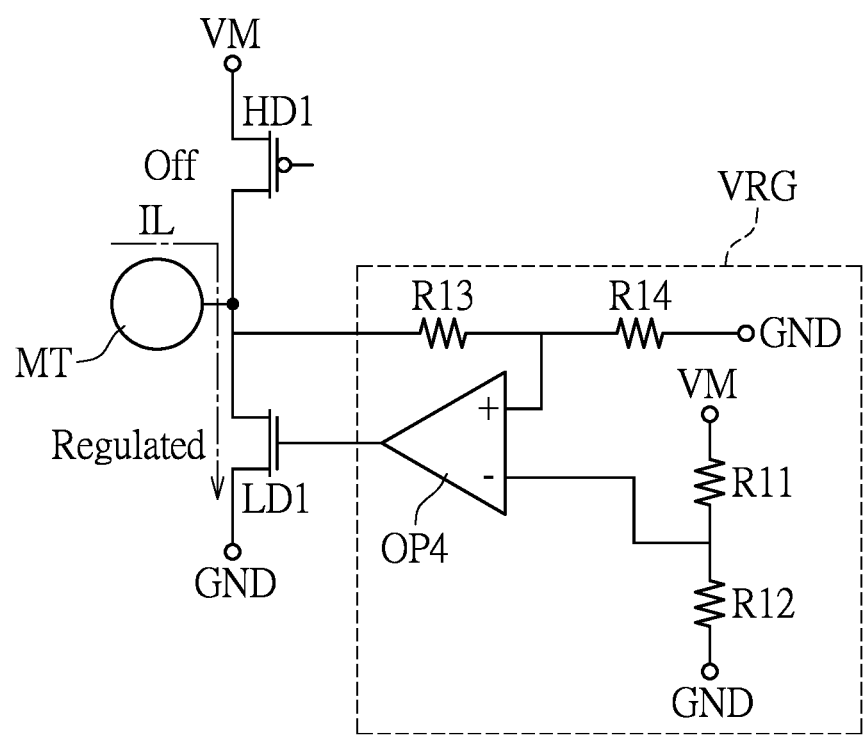
FIG. 9 is a circuit diagram of a voltage regulator circuit of the motor current protecting circuit according to the embodiment of the present disclosure.

Reference is made to FIGS. 1 and 9, in which FIG. 9 is a circuit diagram of a voltage regulator circuit of the motor current protecting circuit according to the embodiment of the present disclosure.

The motor current protecting circuit of the embodiment of the present disclosure may include a plurality of voltage regulator circuits VRG shown in FIG. 9. Output terminals of the plurality of voltage regulator circuits VRG may be connected respectively to control terminals of the plurality of low-side switches such as the first low-side switch LD1, the second low-side switch LD2 and the third low-side switch LD3 as shown in FIG. 1. As shown in FIG. 9, the output terminal of one of the plurality of voltage regulator circuits VRG is connected to the control terminal of the first low-side switch LD1.

The plurality of voltage regulator circuits VRG may respectively regulate the first low-side switch LD1, the second low-side switch LD2 and the third low-side switch LD3.

For example, each of the plurality of voltage regulator circuits VRG may include an operational amplifier OP4. If necessary, each of the plurality of voltage regulator circuits VRG may include one or more of a first voltage divider resistor R11, a second voltage divider resistor R12, a third voltage divider resistor R13 and a fourth voltage divider resistor R14.

A first terminal of the first voltage divider resistor R11 may be coupled to the input voltage VM. A second terminal of the first voltage divider resistor R11 may be connected to a first terminal of the second voltage divider resistor R12. A second terminal of the second voltage divider resistor R12 is connected to a ground GND. A node between the second terminal of the first voltage divider resistor R11 and the first terminal of the second voltage divider resistor R12 may be connected to a second input terminal such as an inverting input terminal of the operational amplifier OP4.

Output terminals of the operational amplifiers OP4 respectively of the voltage regulator circuits VRG may be respectively connected to the control terminals of the first low-side switch LD1, the second low-side switch LD2 and the third low-side switch LD3.

As shown in FIG. 9, a first terminal of the third voltage divider resistor R13 included in the voltage regulator circuit VRG of the first low-side switch LD1 may be connected to a node between the second terminal of the first high-side switch HD1 and the first terminal of the first low-side switch LD1. A first terminal of the third voltage divider resistor R13 included in the voltage regulator circuit VRG of the second low-side switch LD2 may be connected to a node between the second terminal of the second high-side switch HD2 and the first terminal of the second low-side switch LD2 (not shown in figures). A first terminal of the third voltage divider resistor R13 included in the voltage regulator circuit VRG of the third low-side switch LD3 may be connected to a node between the second terminal of the third high-side switch HD3 and the first terminal of the third low-side switch LD3 (not shown in figures).

A second terminal of the third voltage divider resistor R13 may be connected to a first terminal of the fourth voltage divider resistor R14. A second terminal of the fourth voltage divider resistor R14 may be connected to the ground GND. A first input terminal such as a non-inverting input terminal of the operational amplifier OP4 may be connected to a node between the second terminal of the third voltage divider resistor R13 and the first terminal of the fourth voltage divider resistor R14.

When the current of the motor MT is larger than the overcurrent threshold, the plurality of voltage regulator circuits VRG may respectively regulate the plurality of low-side switches to turn off the plurality of low-side switches such as the first low-side switch LD1, the second low-side switch LD2 and the third low-side switch LD3 as shown in FIG. 1, thereby prevent the current of the motor MT from flowing back to the input voltage VM.

In practice, the output terminals of the operational amplifiers OP4 respectively of the plurality of voltage regulator circuits VRG may be respectively connected to control terminals of the plurality of high-side switches such as the first high-side switch HD1, the second high-side switch HD2 and the third high-side switch HD3. The operational amplifiers OP4 may be configured to respectively regulate the plurality of high-side switches to prevent the current from flowing back to the input voltage VM.

When the current of the motor MT is larger than the overcurrent threshold, the plurality of voltage regulator circuits VRG may respectively regulate the plurality of high-side switches to turn off the plurality of high-side switches such as the first high-side switch HD1, the second high-side switch HD2 and the third high-side switch HD3 as shown in FIG. 1.

In summary, the present disclosure provides the motor current protecting circuit. The motor current protecting circuit of the present disclosure determines whether or not each of the plurality of high-side switches or each of the plurality of low-side switches is fully turned on, and calculates the voltage difference between the first terminal and the second terminal of each of the high-side switches being fully turned on or each of the low-side switches being fully turned on. Then, the motor current protecting circuit of the present disclosure performs the calculation on all of the voltage differences each of which is larger than or equal to the zero value to output the voltage signal. Finally, the motor current protecting circuit switches the high-side switches and the low-side switches according to the voltage signal.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor current protecting circuit, comprising:
   an output stage circuit including a plurality of switch components, wherein the plurality of switch components includes:
      a plurality of high-side switches, wherein a first terminal of each of the plurality of high-side switches is coupled to an input voltage; and
      a plurality of low-side switches, wherein first terminals of the plurality of low-side switches are respectively connected to second terminals of the plurality of high-side switches, a second terminal of each of the plurality of low-side switches is grounded, and a node between the second terminal of each of the plurality of high-side switches and the first terminal of each of the plurality of low-side switches is connected to a motor;
   a voltage calculating circuit connected to a first terminal and a second terminal of each of the plurality of low-side switches, wherein the voltage calculating circuit is configured to determine whether or not each of the plurality of low-side switches is fully turned on, to determine whether or not a voltage difference between the first terminal and the second terminal of each of the plurality of low-side switches is larger than or equal to a zero value, and then to output a voltage signal according to all of the voltage differences each of which is larger than or equal to the zero value;
   a control circuit connected to an output terminal of the voltage calculating circuit and configured to output a plurality of control signals according to the voltage signal; and
   a driver circuit connected to the control circuit and a control terminal of each of the plurality of switch components, wherein the driver circuit is configured to drive the plurality of switch components respectively according to the plurality of control signals.

2. The motor current protecting circuit according to claim 1, wherein the voltage calculating circuit includes an adder configured to add up all of the voltage differences each of which is larger than or equal to the zero value to output the voltage signal.

3. The motor current protecting circuit according to claim 1, further comprising:
   a comparator circuit connected to the output terminal of the voltage calculating circuit and an input terminal of the control circuit, wherein the comparator circuit is configured to compare a voltage of the voltage signal with a reference voltage to output a comparing signal to the control circuit, and the control circuit outputs the plurality of control signals according to the comparing signal.

4. The motor current protecting circuit according to claim 3, wherein, when the control circuit receives the comparing signal at a first level and a current of the motor is larger than a current limit threshold, the control circuit controls the driver circuit to turn off all of the plurality of high-side switches, and to fully turn on all of the plurality of low-side switches or to turn on one or more of the plurality of low-side switches according to a back electromotive force of each of phases of the motor; or
   when the control circuit receives the comparing signal at the first level and the current of the motor is larger than the current limit threshold, the control circuit controls the driver circuit to turn off all of the plurality of low-side switches, and to fully turn on all of the plurality of high-side switches or to turn on one or more of the plurality of high-side switches according to the back electromotive force of each of the phases of the motor.

5. The motor current protecting circuit according to claim 4, wherein, when the current of the motor is larger than an overcurrent threshold being larger than the current limit threshold, the control circuit controls the driver circuit to turn off all of the plurality of switch components.

6. The motor current protecting circuit according to claim 4, further comprising:
   a position detector circuit connected to the control circuit, and configured to detect a back electromotive force of each of the phases of the motor to output a back electromotive force signal to the control circuit;
   wherein, when the control circuit receives the comparing signal at the first level and the current of the motor is larger than the current limit threshold, the control circuit controls the driver circuit to turn on one or more of the plurality of low-side switches according to the back electromotive force signal.

7. The motor current protecting circuit according to claim 3, wherein the voltage calculating circuit includes:
   a first operational amplifier, wherein a first input terminal of the first operational amplifier is connected to a first terminal of the motor, a second input terminal of the first operational amplifier is connected to a first terminal of a first transistor, an output terminal of the first operational amplifier is connected to a control terminal of the first transistor, and a second terminal of the first transistor is connected to the output terminal of the voltage calculating circuit;
   a second operational amplifier, wherein a first input terminal of the second operational amplifier is connected to a second terminal of the motor, a second input terminal of the second operational amplifier is connected to a first terminal of a second transistor, an output terminal of the second operational amplifier is connected to a control terminal of the second transistor, and a second terminal of the second transistor is connected to the output terminal of the voltage calculating circuit; and
   a third operational amplifier, a first input terminal of the third operational amplifier is connected to a third terminal of the motor, a second input terminal of the third operational amplifier is connected to a first terminal of a third transistor, an output terminal of the third operational amplifier is connected to a control terminal of the third transistor, and a second terminal of the third transistor is connected to the output terminal of the voltage calculating circuit.

8. The motor current protecting circuit according to claim 7, wherein the voltage calculating circuit further includes:
   a first switch component, wherein a first terminal of the first switch component is connected to the first terminal of the motor, and a second terminal of the first switch component is connected to the first input terminal of the first operational amplifier;
   a second switch component, wherein a first terminal of the second switch component is connected to the second terminal of the motor, and a second terminal of the second switch component is connected to the first input terminal of the second operational amplifier; and
   a third switch component, wherein a first terminal of the third switch component is connected to the third terminal of the motor, and a second terminal of the third switch component is connected to the first input terminal of the third operational amplifier.

9. The motor current protecting circuit according to claim 7, wherein the voltage calculating circuit further includes:
a first input resistor, wherein a first terminal of the first input resistor is connected to the first input terminal of the first operational amplifier, and a second terminal of the first input resistor is grounded;
a second input resistor, wherein a first terminal of the second input resistor is connected to the first input terminal of the second operational amplifier, and a second terminal of the second input resistor is grounded; and
a third input resistor, wherein a first terminal of the third input resistor is connected to the first input terminal of the third operational amplifier, and a second terminal of the third input resistor is grounded.

10. The motor current protecting circuit according to claim 7, wherein the voltage calculating circuit further includes:
a first resistor, wherein a first terminal of the first resistor is connected to the first terminal of the first transistor, and a second terminal of the first resistor is grounded;
a second resistor, wherein a first terminal of the second resistor is connected to the first terminal of the second transistor, and a second terminal of the second resistor is grounded; and
a third resistor, wherein a first terminal of the third resistor is connected to the first terminal of the third transistor, and a second terminal of the third resistor is grounded.

11. The motor current protecting circuit according to claim 7, wherein the voltage calculating circuit further includes:
a first current mirror circuit including a fourth transistor and a fifth transistor, wherein a first terminal of the fourth transistor and a first terminal of the fifth transistor are coupled to a common voltage, a second terminal of the fourth transistor is connected to a control terminal of the fourth transistor, a second terminal of the first transistor and a control terminal of the fifth transistor, and a second terminal of the fifth transistor is connected to the output terminal of the voltage calculating circuit;
a second current mirror circuit including a sixth transistor and a seventh transistor, wherein a first terminal of the sixth transistor and a first terminal of the seventh transistor are coupled to the common voltage, a second terminal of the sixth transistor is connected to a control terminal of the sixth transistor, a second terminal of the second transistor and a control terminal of the seventh transistor, and a second terminal of the seventh transistor is connected to the output terminal of the voltage calculating circuit; and
a third current mirror circuit including an eighth transistor and a ninth transistor, wherein a first terminal of the eighth transistor and a first terminal of the ninth transistor are coupled to the common voltage, a second terminal of the eighth transistor is connected to a control terminal of the eighth transistor, a second terminal of the third transistor and a control terminal of the ninth transistor, and a second terminal of the ninth transistor is connected to the output terminal of the voltage calculating circuit.

12. The motor current protecting circuit according to claim 11, wherein the voltage calculating circuit further includes:
an output resistor, wherein a first terminal of the output resistor is connected to an output terminal of the first current mirror circuit, an output terminal of the second current mirror circuit, an output terminal of the third current mirror circuit and the output terminal of the voltage calculating circuit, and a second terminal of the output resistor is grounded.

13. The motor current protecting circuit according to claim 5, further comprising:
a plurality of voltage regulator circuits, wherein output terminals of the plurality of voltage regulator circuits are respectively connected to the control terminals of the plurality of low-side switches, and the plurality of voltage regulator circuits are configured to respectively regulate the plurality of low-side switches.

14. The motor current protecting circuit according to claim 13, wherein each of the plurality of voltage regulator circuits includes an operational amplifier;
wherein a first input terminal of the operational amplifier is connected to the node between the second terminal of one of the plurality of high-side switches and the first terminal of one of the plurality of low-side switches, a second input terminal of the operational amplifier is coupled to the input voltage, and an output terminal of the operational amplifier is connected to the control terminal of the one of the plurality of low-side switches;
wherein, when the current of the motor is larger than the overcurrent threshold, the plurality of voltage regulator circuits respectively regulate the plurality of low-side switches to turn off the plurality of low-side switches.

15. The motor current protecting circuit according to claim 14, wherein each of the plurality of voltage regulator circuits further includes a first voltage divider resistor and a second voltage divider resistor;
wherein a first terminal of the first voltage divider resistor is coupled to the input voltage, a second terminal of the first voltage divider resistor is connected to a first terminal of the second voltage divider resistor, a second terminal of the second voltage divider resistor is grounded, and a node between the second terminal of the first voltage divider resistor and the first terminal of the second voltage divider resistor is connected to the second input terminal of the operational amplifier.

16. The motor current protecting circuit according to claim 15, wherein each of the plurality of voltage regulator circuits further includes a third voltage divider resistor and a fourth voltage divider resistor;
wherein a first terminal of the third voltage divider resistor is connected to the node between the second terminal of one of the plurality of high-side switches and the first terminal of one of the plurality of low-side switches, a second terminal of the third voltage divider resistor is connected to a first terminal of the fourth voltage divider resistor, a second terminal of the fourth voltage divider resistor is grounded, and a node between the second terminal of the third voltage divider resistor and the first terminal of the fourth voltage divider resistor is connected to the first input terminal of the operational amplifier.

17. The motor current protecting circuit according to claim 1, wherein the plurality of high-side switches include a first high-side switch, a second high-side switch and a third high-side switch, and the plurality of low-side switches include a first low-side switch, a second low-side switch and a third low-side switch;
wherein a first terminal of the first high-side switch is coupled to the input voltage, a first terminal of the first low-side switch is connected to a second terminal of the first high-side switch, a node between the first terminal of the first low-side switch and the second terminal of the first high-side switch is connected to a first terminal of the motor, and a second terminal of the first low-side switch is grounded;

wherein a first terminal of the second high-side switch is coupled to the input voltage, a first terminal of the second low-side switch is connected to a second terminal of the second high-side switch, a node between the first terminal of the second low-side switch and the second terminal of the second high-side switch is connected to a second terminal of the motor, and a second terminal of the second low-side switch is grounded;

wherein a first terminal of the third high-side switch is coupled to the input voltage, a first terminal of the third low-side switch is connected to a second terminal of the third high-side switch, a node between the first terminal of the third low-side switch and the second terminal of the third high-side switch is connected to a third terminal of the motor, and a second terminal of the third low-side switch is grounded.

18. A motor current protecting circuit, comprising:

an output stage circuit including a plurality of switch components, wherein the plurality of switch components includes:
- a plurality of high-side switches, wherein a first terminal of each of the plurality of high-side switches is coupled to an input voltage; and
- a plurality of low-side switches, wherein first terminals of the plurality of low-side switches are respectively connected to second terminals of the plurality of high-side switches, a second terminal of each of the plurality of low-side switches is grounded, and a node between the second terminal of each of the plurality of high-side switches and the first terminal of each of the plurality of low-side switches is connected to a motor;

a voltage calculating circuit connected to a first terminal and a second terminal of each of the plurality of high-side switches, wherein the voltage calculating circuit is configured to determine whether or not each of the plurality of high-side switches is fully turned on, to determine whether or not a voltage difference between the first terminal and the second terminal of each of the plurality of high-side switches is larger than or equal to a zero value, and then to output a voltage signal according to the voltage difference according to all of the voltage differences each of which is larger than or equal to the zero value;

a control circuit connected to an output terminal of the voltage calculating circuit and configured to output a plurality of control signals according to the voltage signal; and a driver circuit connected to the control circuit and a control terminal of each of the plurality of switch components, wherein the driver circuit is configured to drive the plurality of switch components respectively according to the plurality of control signals.

19. The motor current protecting circuit according to claim 18, further comprising:

a comparator circuit connected to the output terminal of the voltage calculating circuit and an input terminal of the control circuit, wherein the comparator circuit is configured to compare a voltage of the voltage signal with a reference voltage to output a comparing signal to the control circuit, and the control circuit outputs the plurality of control signals according to the comparing signal.

20. The motor current protecting circuit according to claim 19, wherein, when the control circuit receives the comparing signal at a first level and a current of the motor is larger than a current limit threshold, the control circuit controls the driver circuit to turn off all of the plurality of high-side switches, and to fully turn on all of the plurality of low-side switches or to turn on one or more of the plurality of low-side switches according to a back electromotive force of each of phases of the motor; or when the control circuit receives the comparing signal at the first level and the current of the motor is larger than the current limit threshold, the control circuit controls the driver circuit to turn off all of the plurality of low-side switches, and to fully turn on all of the plurality of high-side switches or to turn on one or more of the plurality of high-side switches according to the back electromotive force of each of the phases of the motor.

* * * * *